United States Patent Office 3,573,991
Patented Apr. 6, 1971

3,573,991
PROCESS FOR THE PREPARATION OF THIN ELECTRODES FOR FUEL CELLS
Pierre Lenfant, Les Grandes, Pierre-Jean Bono, Massy, Alexis Tissier, Sainte-Genevieve-des-Bois, and Robert Chevet, Chilly-Mazarin, France, assignors to Compagnie Generale d'Electricite, Paris, France
Filed May 20, 1968, Ser. No. 730,547
Claims priority, application France, May 18, 1967, 106,891; May 25, 1967, 107,849; Dec. 26, 1967, 133,769
Int. Cl. B05b 5/02; B22f 7/00; H01m 27/04
U.S. Cl. 136—120                                                    12 Claims

ABSTRACT OF THE DISCLOSURE

A process for the preparation of thin electrodes for fuel cells having at least one barrier layer situated on its electrolyte side in contact with a catalytically active layer including the steps of depositing a finely screened powder on a support by electrostatic projection to form the barrier layer; subjecting the layer to compression and sintering treatments; and depositing the catalytically active layer by similar process.

BACKGROUND OF THE INVENTION

The present invention relates to a process for the preparation of thin electrodes for fuel cells and to the electrodes obtained by this process.

Despite their small thickness, such electrodes must have a composite texture comprising at least two different layers. The first of these layers is called the "barrier layer," the thickness of which is of the order of 0.1 mm. and the pores of which are very fine and have diameters of the order of $1/1000$ of a millimeter, i.e. roughly of the order of one-hundredth of the thickness of the whole layer. The object of the said barrier layer is to prevent bubbling of the electrode, while affording through the electrolyte, by capillarity, a passage to the succeeding layer.

A second layer, called the "active layer," having a thickness substantially three times as great as that of the "barrier layer," the said second layer having distinctly wider pores than the said barrier layer, the width of which pores may notably reach between five and ten times that of the said pores of the "barrier layer"; the function of the "active layer" is to support the catalyst intended to activate the electrochemical reaction which is to take place at the said active layer, which catalyst is incorporated in the mass of the layer supporting it, but is present mainly on the surface of the pores of the latter, i.e., at those points at which the electrolyte is brought into contact with the gas constituting the fuel or combustion-assisting agent of the cell.

Optionally, the active layer supports a third layer, called the "gas compartment layer," which is of a thickness comparable to that of the "barrier layer" and has pores of dimensions similar to or even larger than those of the pores of the "active layer." The function of this layer, which does not contain any catalyst, is to provide an appropriate compartment for the gases, above all when they operate under low pressures.

The active layer, or the gas compartment layer when it exists, may be coated with a porous layer of water-repellent material, for example Teflon. As compared with the previously known electrodes, such thin electrodes have a number of advantages, notably a higher power-to-weight ratio, i.e. a lower weight for the same effect, which results in a reduction of the expenditure. Another advantage is the readiness with which such electrodes can be assembled by reason of their inherent flexibility.

In addition, such electrodes make it possible by reason of their small thickness to reduce the extent of the undesirable diffusion phenomena which generally accompany the reaction of which they are the center. This results more particularly in an increased possibility of eliminating the products of the said reaction, for example water, in the case of the hydrogen-oxygen cell.

The small thickness of the electrodes affords a further advantage which results from the fact that wider pores can be more readily formed in such electrodes, whereby it is possible, as is known, to lower the operating pressure of the fuel. This fact may be utilized, for example, by replacing pure oxygen by atmospheric air in hydrogen-oxygen cells.

SUMMARY OF THE INVENTION

The present invention relates to a process for the preparation of thin electrodes for fuel cells which comprise at least one so-called "barrier layer" situated on the electrolyte side, in contact with a catalytically active layer, characterized in that, in a first phase, there is deposited upon a support by electrostatic projection a finely screened powder intended to form the barrier layer, and, after the layer thus deposited has been subjected to a compression and sintering treatment, the catalytically active layer is then deposited.

In one embodiment, the support is porous. It may consist of a very fine metal braid having meshes smaller than one-tenth of a millimeter.

When the powder grain layer intended to supply the future "barrier layer" is deposited upon the said support, the grains, whose dimensions are distinctly smaller than those of the meshes of the porous support, are agglomerated to form a compact layer which can closely enclose the support.

In a particularly advantageous embodiment, the catalytically active layer is deposited upon the barrier layer by electrostatic projection from a finely screened powder, the layer thus formed thereafter being subjected to a sintering operation.

The advantage afforded by deposition by electrostatic projection over other methods of deposition is that it involves no binder in which the powder might be previously dispersed or dissolved and no fusion of particles. It is known that the elimination of a binder causes considerable heterogeneous porosities and that on the other hand even partial fusion of the powder particles completely destroys the active structure of this powder.

The porosity of the layers deposited by electrostatic projection may be adjusted by varying the grain size of the powders, the nature of the powders, the distance between the support and the electrostatic projections apparatus, the conditions under which the powders are fluidized and the extent of rolling or compression, if any.

Further features and advantages of the invention will become apparent in the course of the following description and with reference to the accompanying drawings, which description and drawings concern one embodiment of the process according to the invention, referred to purely by way of non-limiting illustration, the said process being applied to the preparation of thin nickel-silver electrodes, the silver being introduced in the form of silver oxide in this example.

DESCRIPTION OF THE PREFERRED EMBODIMENTS

Figure 1:
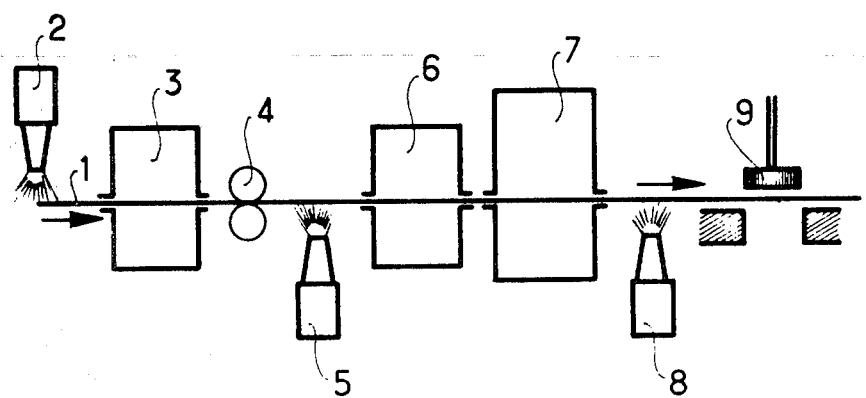
FIG. 1 diagrammatically illustrates the performance of the process according to the invention.

A strip-form porous support 1 consists, for example, of nickel gauze whose characteristics are as follows:

|  | Mm. |
|---|---|
| Diameter of the wire | 60/1000 |
| Square mesh having sides of | 80/1000 |

This strip moves continuously in a horizontal plane, for example in the direction of the arrow.

Nickel ex-carbonyl is first projected onto one of the faces of the gauze, for example onto the upper face, by means of an electrostatic projection apparatus 2. Sintering is thereafter effected in a furnace 3 under hydrogen at about 700° C. The process is then continued by rolling between rolls 4, whereby the formation of the "barrier layer" is completed.

A further projection is then effected by means of a second electrostatic projection apparatus 5, the powder consisting this time of a mixture of nickel and silver oxide, this mixture being intended to form the "active layer."

A second sintering at about 350° C., but under a nitrogen atmosphere in this case, is then performed in the furnace 6, whereafter still another sintering is effected at a similar temperature, but under a nitrogen atmosphere, in the furnace 7, this sintering being intended above all to activate catalytically the nickel-silver material.

If necessary, further nickel is projected by means of an electrostatic projection apparatus, and this is followed by sintering at about 350° C. (this phase is not shown in the figure) to form the "gas compartment layer" of the electrode, which, together with the porous support, contributes to the good mechanical stability of the electrode.

It is to be noted that the porous support does not participate in the electrochemical reaction, since it is exclusively intended to ensure mechanical rigidity of the plate while not impairing the porosity of the latter.

The final operation consists in projecting a water-repellant material by means of an electrostatic projection apparatus 8 onto the strip thus treated, which material may be, for example, "Teflon" powder.

The electrodes may be brought to the desired dimensions by means of the cutting tool 9. The plates thus cut may be employed to form plane electrodes or, if necessary, to form hollow electrodes by combining in fluid-tight manner two identical thin plates according to the invention, which are disposed in parallel relationship on their periphery with the aid of an insulating plastic. Hollow, bipolar electrodes may also be formed with the aid of the same plates in the manner just described, these plates comprising in addition a fluid-tight diaphragm which is preferably a good electrical conductor and which longitudinally separates the hollow electrode into two compartments, into each of which either the fuel or the combustion-assisting gas of the cell may be introduced.

The active layer may be deposited, in relation to the support either on the same side as the barrier layer or on the other face.

The above-described process may be carried out continuously, as illustrated, the support then moving past the various working stations, or it may be carried out discontinuously.

Figure 2:
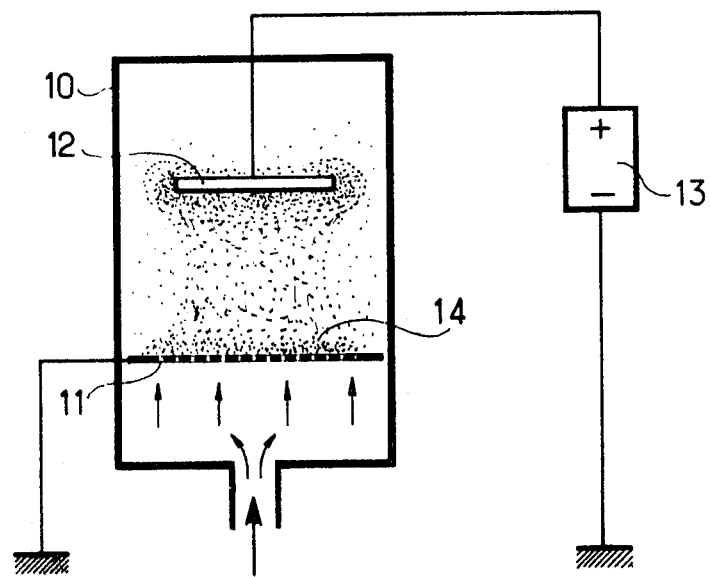
FIG. 2 diagrammatically illustrates an electrostatic projection apparatus.

FIG. 2 illustrates in very diagrammatic form an apparatus for the electrostatic projection.

The reference 10 denotes an enclosure, for example of insulating material, in the lower part of which there is disposed a grounded, porous conductive support 11. Disposed opposite support 11 is a support 12 to be covered by electrostatic projection. Support 12 is connected to the positive pole of a voltage generator 13, the other pole of which is grounded. Powder 14 to be deposited is disposed on support 11 and a current of gas, for example air or nitrogen, is passed under support 11 so as to fluidize the powder 14 and thus to create a homogeneous cloud of fluidized powder.

The fluidized powder particles, which are charged by their contact with support 11, become deposited upon support 12 of opposite charge. The following parameters are typical of the system:

voltage V: 10 to 90 kv.

height $h$ of the powder bed on the support 11: 2 to 2.5 cm.

distance $d$ of the powder bed from the support 12 to be covered: 20 to 25 cm.

It has been found that for:

$$V = 90 \text{ kv.}$$

$$h = 2.5 \text{ cm.}$$

$$d = 22$$

the weight of powder P deposited is a linear function of the time between 0 and 180 seconds.

If $t$ is the deposition time in seconds, we have substantially:

$$P_{\text{mg./cm.}^2} = 0.96t$$

It is to be noted that under the above-indicated conditions, beyond 180 seconds, the deposit is too great and spontaneously detaches from the support.

In another embodiment, the catalytically active layer may be formed by application of a coating containing the catalyst, which is thereafter dried.

There is given in the following by way of non-limiting illustration an example of such an embodiment for nickel-boron electrodes. A porous support having the same characteristics as above is employed.

The first operation consists in projecting a finely screened nickel ex-carbonyl powder onto one of the faces of the porous support by means of an electrostatic projection apparatus.

Sintering is thereafter effected at about 600° C. under hydrogen. The whole is thereafter subjected to a high compression, of the order of 500 kg./cm.$^2$ which compression may consist of rolling if the manufacture takes place continuously.

A second sintering, at about 800° C., again under a hydrogen atmosphere, is carried out after the compression or rolling.

The coating based upon nickel-boron, whose above skeleton will be covered, in meanwhile prepared.

The preparation of the coating in question takes place as follows:

The pulverous nickel-boron catalyst being kept in water, it is necessary first to obtain the catalyst in anhydrous form. For this purpose, the appropriate quantity is extracted and subjected to very gradual drying in vacuo, first at ambient temperature and then in a second phase at about 120° C., again in vacuo. The whole of the water contained in the powder is thus certain to be eliminated.

The nickel-boron powder thus obtained has the feature of not being pyrophoric, which is a particular advantage since, in the course of the subsequent treatments for the preparation of an electrode, this powder will be subjected to the action of the oxygen of the air, which might otherwise cause a sudden oxidation of the highly divided powder.

Starting with the dehydrated nickel-boron powder, the latter is then mixed in substantially equal quantities with nickel ex-carbonyl, of the same specification as above, which has been projected onto the porous support. The mixture thus obtained is dispersed in a previously prepared bath, which itself contains about 5 grams of polystyrene to 100 cc. of benzene. The corresponding proportion is about 1 gram of nickel-boron/nickel ex-carbonyl powder to about 1 cc. of solution.

The said proportion constitutes to some extent an optimum since, in the electrode, the polystyrene granules and the granules of the nickel-boron/nickel ex-carbonyl mixture are closely interlocked, and consequently an excess of polystyrene might render the electrode completely water-proof, while on the other hand the electrical conductivity of the latter is essentially ensured by the nickel-boron/nickel ex-carbonyl mixture.

It is the mixture, in suspension in the polystyrene-containing benzene, that will constitute the coating to be applied to the initial porous support, this coating being applied to that face of the said support which has not received the projection of nickel ex-carbonyl. The coating may be applied by any known means, either manually or mechanically. The operation is completed by drying in an oven at about 60° C.

There is thus obtained a skeleton consisting essentially of two layers; the first, called the "barrier layer," consisting of the deposit agglomerated under nickel ex-carbonyl pressure and is intended to be brought into contact with the electrolyte, while the second, called the "active layer," will be brought into contact with the gas, the water-proofing of the latter coating by the polystyrene being intended to prevent complete impregnation of the said layer by electrolyte.

It is then possible to cut out from the support thus treated, which is a few tenths of a millimeter thick, plates having the dimensions of electrodes intended for the cells to be constructed.

In the aforesaid embodiments, the barrier layer is deposited upon a porous support, which is in fact embedded in the layer. However, it may be advantageous in some cases to omit this support, because, owing to its presence, the compressing or rolling operation may produce zones of variable porosity due to the presence of the wires of which the gauze is formed. Moreover, the extent of rolling is limited by the crushing of the support.

In addition, in the course of the sintering operations, various thermal stresses may be set up between the porous support and the material deposited thereon, which may result in buckling of the element.

It is also to be noted that the presence of the support increases the thickness of the barrier layer, its weight and its cost, notably by reason of the treatments which the support must undergo before it is used, as also by reason of the danger of disintegration. Finally, the support must be completely adapted to the grain size of the powder.

In accordance with the invention, the presence of the porous support may be avoided by depositing the pulverous material intended to form the barrier layer upon a metal foil and then subjecting the whole obtained to a rolling treatment, whereafter the foil is separated from the deposited layer, which then undergoes a sintering operation. By way of example, the foil consists of nickel and the material intended to form the barrier layer is nickel powder.

If desired, a barrier layer having variable porosity may be produced by coating the layer deposited upon the support after rolling and before sintering with a second layer consisting of the same material, but having a different porosity. After this deposition, a further rolling is performed, followed by sintering.

The sintering of the barrier layer may be carried out in an inert atmosphere, for example under nitrogen, under pure hydrogen or under a hydrogenating atmosphere, for example under hydrogenated nitrogen, for example at a temperature between 700° and 800° C. The sintering of the barrier layer may be carried out in an inert atmosphere, for example, first under argon at about 350° C. and then under hydrogen at about 350° C.

There is thereafter deposited upon the sintered barrier layer by electrostatic projection a layer intended to form the active layer of the electrode, and sintering is optionally effected. The layer thus deposited may consist of a catalytic material or of a porous metal, and may thereafter be activated, for example thermally or by impregnation. It may also be waterproofed.

The processes described in the foregoing with reference to the manufacture of the barrier layer and of the active layer may obviously be carried out continuously.

Of course, it is not possible to produce an electrode by depositing the material constituting the barrier layer upon the active layer already formed, because the rolling and sintering treatments which are necessary for the formation of the barrier layer would have the effect of at least partially destroying the catalytic properties of the said active layer.

By way of non-limiting illustration, there have been obtained by application of the process according to the invention nickel barrier layers having a thickness of 0.08 mm., starting with a nickel ex-carbonyl powder whose mean grain size is less than 37 microns. The sintering was carried out for one hour under hydrogen at a temperature of the order of 750° C.

The porosity of the barrier layer produced depends upon the thickness before rolling and upon the extent of rolling. The following results were thus obtained:

| Period of projection of the nickel grains | Weight of material deposited upon the foil, mmg./cm.² | Thickness of the layer deposited before rolling, mm. | Thickness of the layer deposited after the rolling, mm. | Mean radius of the pores of the barrier layer | Boundary bubbling pressure in 6 N KOH at 25° C., g./cm.² |
|---|---|---|---|---|---|
| 40 s | 28 | 0.99 | 0.08 | 2.3μ | 250 |
| 90 s | 47 | 0.12 | 0.08 | 1.9μ | 400 |
| 120 s | 74 | 0.14 | 0.08 | 0.4μ | 500 |

While the invention has been particularly shown and described with reference to a preferred embodiment thereof, it will be understood by those skilled in the art that various changes in form and details may be made therein without departing from the spirit and scope of the invention.

What is claimed is:

1. A process for preparing thin electrodes for fuel cells having at least one barrier layer situated on its electrolyte side in contact with a catalytically active layer comprising the steps of:
    (a) depositing a finely screened powder on a support by electrostatic projection to form said barrier layer,
    (b) subjecting said barrier layer to compression and sintering treatments, and
    (c) depositing said catalytically active layer on one of the faces of said barrier layer.

2. A process as defined in claim 1 in which said support consists of a metal foil and wherein after deposition of the barrier layer, the whole obtained is subjected to said compressing treatment, whereafter said foil is separated from the deposited layer, which then undergoes said sintering operation.

3. A process as defined in claim 1 wherein said support is porous and is embedded in the barrier layer.

4. A process as defined in claim 3 wherein said barrier layer is produced by electrostatic projection of a nickel ex-carbonyl powder, said support is formed of a nickel gauze, said sintering treatment is conducted under hydrogen at about 700° C., and said barrier layer is compressed by passage between two opposed rollers.

5. A process as defined in claim 3 in which said catalytically active layer is produced by coating the barrier layer with a paste then heating the coating to dry the paste.

6. A process as defined in claim 3, wherein said barrier layer is produced by electrostatic projection of a nickel ex-carbonyl powder, said support is formed of a nickel gauze, said sintering treatment is conducted under hydrogen at about 600° C., and then compression treatment follows said sintering treatment and is conducted under a pressure of the order of 500 kg./cm.², and further comprises the step of sintering under hydrogen at about 800° C.

7. A process as defined in claim 1 wherein the step of depositing said catalytically active layer is effected by electrostatic projection of finely screened powder and further including the step of subjecting said catalytically active layer to a sintering operation.

8. A process as defined in claim 7 further comprising the step of depositing a layer of a water-repellent material on said catalytically active layer by electrostatic projection from a powder.

9. A process as defined in claim 7 wherein said finely screened powder of said catalytically active layer consists of a mixture of nickel and silver oxide, and wherein said sintering operation is conducted first under argon at about 350° C. and then under hydrogen at about 350° C.

10. A process as defined in claim 7 further comprising the steps of depositing a gas-compartment layer by electrostatic projection of a powder on said catalytically active layer and subjecting said gas-compartment layer to a sintering operation.

11. A process as defined in claim 10 wherein the step of depositing said gas-compartment layer is conducted by electrostatic projection of a nickel powder and said last mentioned step is conducted at about 350° C.

12. A process as defined in claim 10 further comprising the step of depositing a layer of a water-repellent material on said gas-compartment layer by electrostatic projection from a powder.

References Cited

UNITED STATES PATENTS

| | | | |
|---|---|---|---|
| 3,134,696 | 5/1964 | Douglas et al. | 136—86 |
| 3,226,263 | 12/1965 | Oswin | 136—86 |
| 3,382,085 | 5/1968 | Wren et al. | 117—93.4X |

WINSTON A. DOUGLAS, Primary Examiner

M. J. ANDREWS, Assistant Examiner

U.S. Cl. X.R.

29—182.3; 75—208; 117—93.4